(12) United States Patent
Rodriguez et al.

(10) Patent No.: US 7,747,590 B2
(45) Date of Patent: Jun. 29, 2010

(54) AVOIDING REDUNDANT COMPUTATION IN SERVICE-ORIENTED ARCHITECTURES

(75) Inventors: Adolfo F. Rodriguez, Raleigh, NC (US); Richard E. Salz, Reading, MA (US); Gregory L. Truty, Austin, TX (US); Barton C. Vashaw, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 11/848,810

(22) Filed: Aug. 31, 2007

(65) Prior Publication Data

US 2009/0063498 A1 Mar. 5, 2009

(51) Int. Cl.
*G06F 17/00* (2006.01)

(52) U.S. Cl. ............... 707/699; 709/203; 709/223; 709/225

(58) Field of Classification Search .......... 707/10, 707/103 R, 103 Y, 203; 726/21; 713/153; 709/203, 223, 225

See application file for complete search history.

(56) References Cited

U.S. PATENT DOCUMENTS

| 7,467,399 B2 * | 12/2008 | Nadalin et al. ............ 726/2 |
| 7,493,302 B2 * | 2/2009 | Emuchay et al. ........... 707/1 |
| 7,577,990 B2 * | 8/2009 | Smith et al. ............. 726/21 |
| 2003/0105806 A1 * | 6/2003 | Gayle et al. ............ 709/203 |
| 2005/0144277 A1 * | 6/2005 | Flurry et al. ........... 709/225 |
| 2005/0222931 A1 * | 10/2005 | Mamou et al. ............ 705/35 |
| 2009/0094453 A1 * | 4/2009 | Bradley et al. .......... 713/153 |

* cited by examiner

*Primary Examiner*—Don Wong
*Assistant Examiner*—Hanh B Thai
(74) *Attorney, Agent, or Firm*—Dillon & Yudell LLP

(57) ABSTRACT

A request for a software service utilizes a service intermediary. The service intermediary 1) checks the request to confirm that it conforms to XML well-formedness, and 2) validates the schema of the request. If the request passes both tests, then flags are appended to the request, which is sent to a service provider. The flag indicates to the service provider that the request has already been checked and validated, such that the service provider only needs to provide the requested service, without redundantly checking and validating the request.

3 Claims, 4 Drawing Sheets

AVOIDING REDUNDANT COMPUTATION IN SERVICE-ORIENTED ARCHITECTURES

BACKGROUND OF THE INVENTION

The present disclosure relates to the field of computers, and specifically to software. Still more specifically, the present disclosure relates to processing software service requests.

Extensible Markup Language (XML) has emerged as the de-facto standard for expressing self-describing data, particularly when requesting a service (e.g., software) from a service provider. XML documents are posted using underlying transport protocols such as HyperText Transfer Protocol (HTTP) and IBM's Websphere™ MQ to effect service invocations, generate events, and to exchange complex data types. Service Oriented Architecture Protocol (SOAP), built atop XML, provides a standard way of enabling Remote Procedure Calls (RPC), where services are programmatically invoked by consumers. Web Services, the corner-stone of Service Oriented Architecture (SOA), are enabled using a SOAP facade that is described in a Web Services Description Language (WSDL). While Web Services and XML take a collective leap forward in providing self-describing application endpoints (and thus virtualized services), the abstraction comes with a substantial performance penalty. SOAP-based interactions are inherently many times more costly (in terms of computational cost) than home-grown Remote Procedure Call (RPC) systems. Much of this is due to expensive XML parsing and SOAP object de-serialization, including the creation of in-memory objects that represent the XML-encoded data. Often, XML processing is redundant, such as when the same XML is checked for well-formedness and validity.

BRIEF SUMMARY OF THE INVENTION

A request for a software service utilizes a service intermediary. The service intermediary 1) checks the request to confirm that it conforms to XML well-formedness, and 2) validates the schema of the request. If the request passes both tests, then flags are appended to the request, which is sent to a service provider. The flags indicate to the service provider that the request has already been checked and validated, such that the service provider only needs to provide the requested service, without redundantly checking and validating the request.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF THE INVENTION

Figure 1:
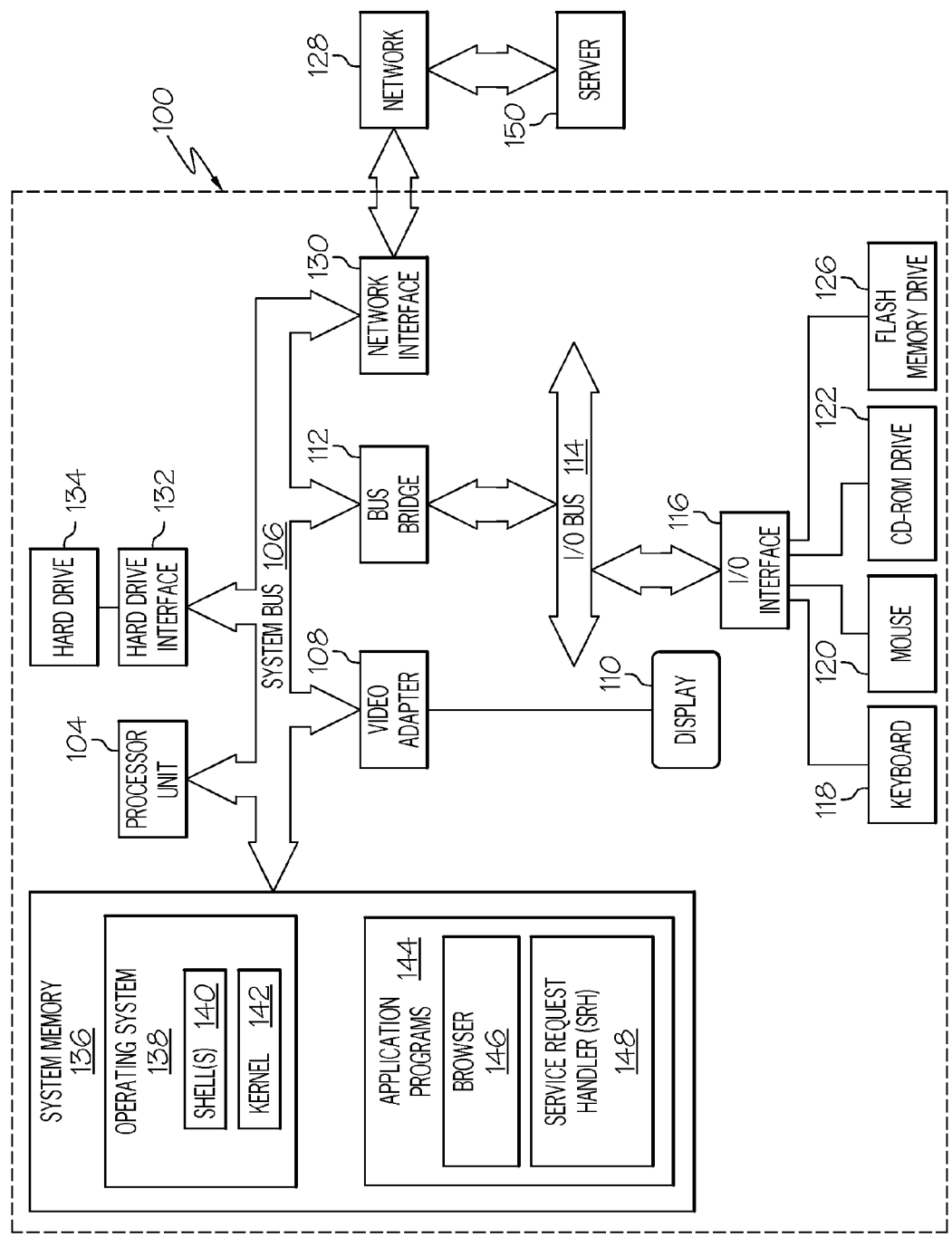
FIG. 1 depicts an exemplary computer in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include a Service Request Handler (SRH) 148, which performs the functions described below in FIG. 3 and FIG. 4.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
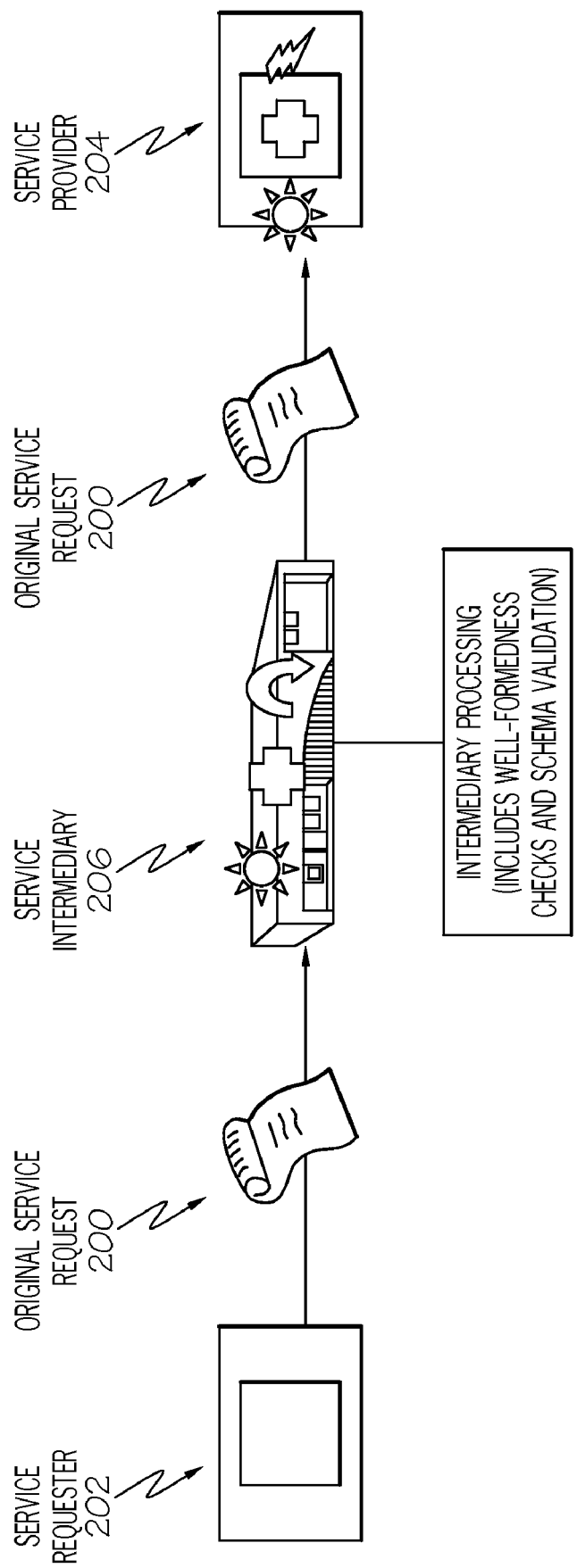
FIG. 2 illustrates an exemplary prior art process for requesting service.

With reference now to FIG. 2, a prior art method for handling a service request 200 from a service requester 202 to a service provider 204 via a service intermediary 206 is illustrated. The service intermediary 206 performs well-formedness checking (indicated by the sun symbol) and schema validation (indicated by the cross symbol) before eventually forwarding on the original service request 200. The well-formedness check confirms that the service request follows the construct requirements of XML. Examples of such construct requirements include, but are not limited to, command formats, punctuation (e.g., carats) requirements, etc. Schema validation confirms that the XML document (service request) follows the protocols set for a particular type of request, such as a request for a particular service. Examples of such schema include, but are not limited to, a requirement that a tag contain only letters or numerals, definitions of tag variables, naming convention of the requested service, etc. If the service request 200 passes the XML well-formedness check (mandatory) and the schema validation (performed only if a schema actually exists for the service request), then the unchanged original service request 200 is forwarded to the service provider 204. Upon receiving the original service request 200 from the service intermediary 206, the service provider 204 redundantly performs well-formedness checking (again indicated by the sun symbol) and schema validation (again indicated by the cross symbol) before eventually servicing (indicated by the lightning bolt symbol) the request, and returning the requested service to the service requester 202.

Figure 3:
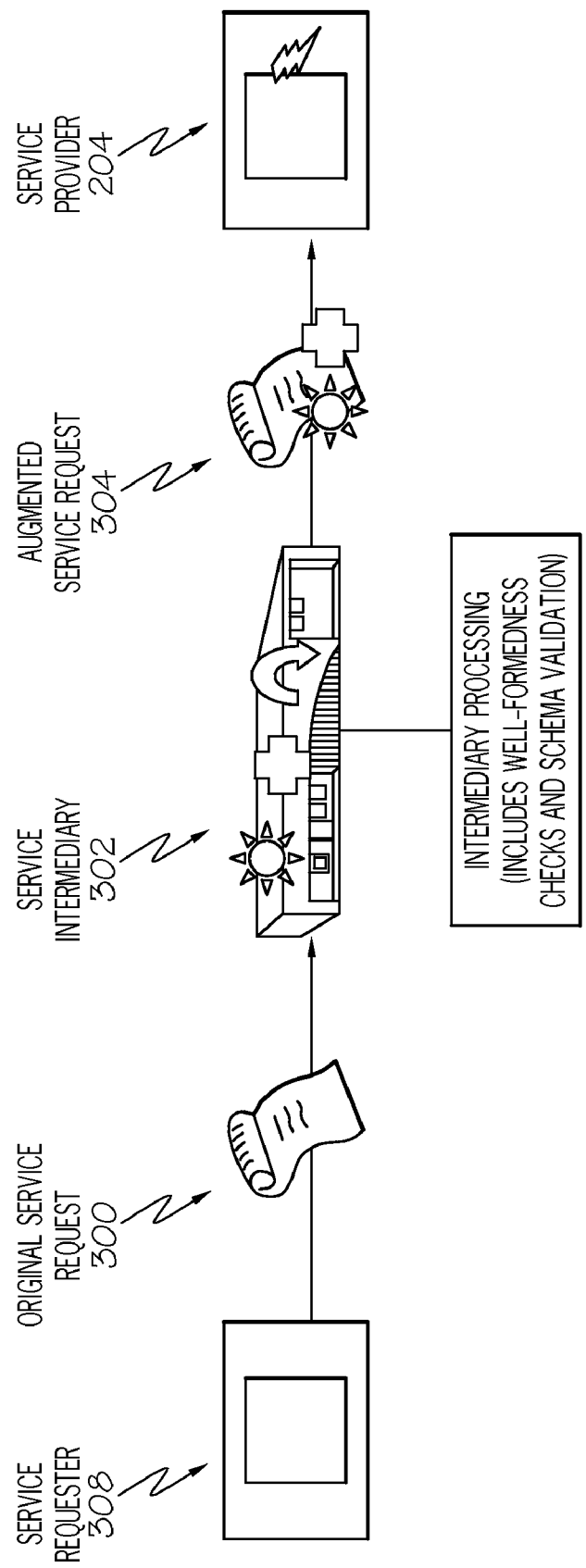
FIG. 3 depicts the scenario illustrated in FIG. 2 with the improvement of modifying the service request with additional information from a service intermediary.

As illustrated in FIG. 3, the present invention augments an original service request 200 with intermediate results of well-formedness checking and schema validation so that the redundant processing described in FIG. 2 can be avoided by the service provider. Thus, as shown in FIG. 3, a service request 300 is sent to a service intermediary 302, where well-formedness checking and schema validation is performed. After checking well-formedness and validating the schema of the service request 300, the service intermediary 302 augments the original service request 300 to create an augmented service request 304. The augmented service request 304 includes flags indicating that the service intermediary 302 has already checked and validated the service request, and thus the service provider 306, which will provide the actual service being requested, does not have to redundantly perform these checking and validating operations. Rather, the service provider 306 need only return the requested service (indicated by the lightning bolt symbol) to the service requester 308. Examples of the requested service that are returned from the service provider 306 include, but are not limited to, on-demand software, portlets, software applications, portals, operating systems, webpages, and any other type of computer-based content.

Figure 4:
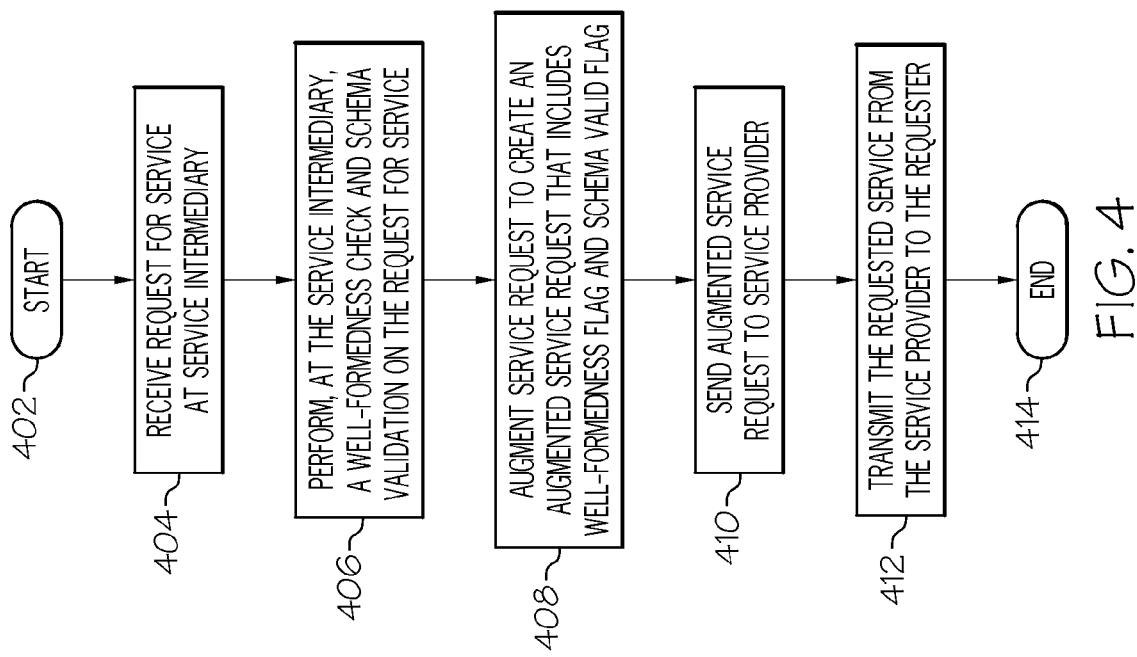
FIG. 4 illustrates exemplary steps taken to process a service request in accordance with the present invention.

With reference now to FIG. 4, a flow-chart describing the process shown in FIG. 3 is presented. After initiator block 402, which may be prompted by a user requesting a service from a service provider, the request for service is received by a service intermediary (block 404). As described in block 406, the service intermediary checks the well-formedness and validates the schema of the request for service. In a preferred embodiment, if the service request already contains flags indicating that the service request has previously been checked and validated, these flags are cleared until after such time that the service intermediary is able to confirm that the service request presently conforms to the XML format and follows the requisite schema. After performing this check and validation, the service intermediary augments the request for service with flags that indicate that the request for service is in conformance with the XML format, and that it follows the schema required for requesting that particular service (block 408). The service provider then receives the augmented service request (block 410), and is able to send the requested service to the service requester without having to redundantly check and validate the service request (block 412). The process ends at terminator block 414.

As described above, the service provider avoids the costly XML operations of redundantly checking and validating the service request, and simply services the service request. In one embodiment, transport headers are used to encode necessary state serialization. This enables the back-end service provider (e.g. IBM's Websphere™ Application Server—WAS) to quickly extract and leverage such transport headers.

The following example illustrates pseudo code for a Web Service request over an HTTP transport with appropriate headers. It shows the addition of two headers used to indicate that this request has been verified as well-formed and is schema validated.

POST  /BankingServicesWeb/services/BankingService-Soap HTTP/1.1
      Host: localhost
      Accept: application/soap+xml,multipart/related,text/*
      User-Agent: IBM WebServices/1.0
      Cache-Control: no-cache
      Pragma: no-cache
      SOAPAction: " "
      Connection: Keep-Alive
      Content-Type: text/xml; charset=utf-8
      Content-Length: 1538
      Date: Wed, 11 Jan. 2006 23:01:32 GMT
      Is-Well-Formed: Yes
      Is-Schema-Validated: Yes Upon receiving this posted HTTP data, the service provider will determine if the appropriate headers have been included and if so, can avoid the corresponding expensive tasks. In one embodiment, the present invention adds tags to the root-level object of the XML that encode the same information (i.e. binary flags that indicate whether well-formedness checking and schema validation have been performed). In this way, the receiving service provider can quickly access the information and bypass the costly XML operations.

In one embodiment, security is added to the above described process. For example, an attacker might post XML with the flags turned on (indicating that the service request has been checked for well-formedness and valid schema), even though the posted XML is actually malicious and could cause undesirable side effects. To avoid this, the Internet Protocol (IP) address from which the service request was sent is validated by the service intermediary by checking against a list of trusted IP addresses. In addition, Secure Socket Layer (SSL) client authentication and other standard authentication mechanisms can be employed (e.g., HTTP basic authentication). Likewise, a service intermediary should also remove stale headers inserted by previous intermediaries.

The present invention provides a marked and novel improvement over the prior art by achieving greater functional SOA performance through the user of explicit information exchange between service intermediaries (e.g., DataPower™) and service providers (e.g., WebSphere™). In general, this includes augmenting service requests with additional intermediary processing information in an easily consumable fashion. This is particularly attractive when one considers an intermediary state that is easily serializable (in terms of size and complexity) into a service request. Such states can be augmented either at the SOAP/XML layer or, more efficiently, in the transport (e.g., HTTP or MQ) layer. More precisely, a transport-level header carries the request's intermediate processing state so that it can be leveraged in the next SOAP hop (the next service intermediary or the final service provider). The use of binary flags indicates whether XML well-formedness checking and XML schema validation have already been performed on the request in question. The process is extensible to include additional validation mechanisms such as Schematron™. In these cases, the next service hop can reduce or avoid expensive computations altogether. That is, well-formedness checking and schema validation in the service provider is completely obviated based on whether it is guaranteed to have been already performed.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for processing a software service request, the method comprising:
   receiving, at a service intermediary, a software service request from a software service requester, wherein the software service request is an Extensible Markup Language (XML) document that is requesting a software service from a service provider;
   checking, at the service intermediary, the software service request for well-formedness, wherein checking for well-formedness confirms that the software service request follows construct requirements of XML;
   validating, at the service intermediary, a schema of the software service request, wherein validating the schema confirms that the XML document follows protocols set for a particular type of request for a particular software service;
   in response to the service intermediary confirming that the XML document is well-formed and follows a proper schema for requesting the particular software service, augmenting the software service request with flags to create an augmented software service request, wherein the flags indicate that the XML document has passed the checking and validating steps;
   transmitting the augmented software service request from the service intermediary to a service provider;
   reading the flags at the service provider, wherein the flags indicate to the service provider that the augmented software service request has passed the checking and validating steps; and
   transmitting the requested software service from the service provider to the software service requester, wherein the service provider does not redundantly perform the checking and validating steps that have been performed by the service intermediary;
   wherein the construct requirements of XML comprise XML command formats and XML punctuation requirements, and wherein the schema comprises 1) a requirement that a tag contain only letters; 2) definitions of tag variables; and 3) naming conventions for the particular software service that has been requested.

2. A computer program product for processing a software service request, the computer program product comprising:
   a computer usable storage medium having computer usable program code stored thereon, the computer usable program code comprising:
   computer usable program code configured for receiving, at a service intermediary, a software service request from a software service requester, wherein the software service request is an Extensible Markup Language (XML) document that is requesting a software service from a service provider;
   computer usable program code configured for checking, at the service intermediary, the software service request for well-formedness, wherein checking for well-formedness confirms that the software service request follows construct requirements of XML;
   computer usable program code configured for validating, at the service intermediary, a schema of the software service request, wherein validating the schema confirms that the XML document follows protocols set by a particular type of request for a particular software service;
   computer usable program code configured for, in response to the service intermediary confirming that the XML document is well-formed and follows a proper schema for requesting the particular software service, augmenting the software service request with flags to create an augmented software service request, wherein the flags indicate that the XML document has passed the checking and validating steps;
   computer usable program code configured for transmitting the augmented software service request from the service intermediary to a service provider;
   computer usable program code configured for reading the flags at the service provider, wherein the flags indicate to the service provider that the augmented software service request has passed the checking and validating steps; and
   computer usable program code configured for transmitting the requested software service from the service provider to the software service requester, wherein the service provider does not redundantly perform the checking and validating steps that have been performed by the service intermediary;
   wherein the construct requirements of XML comprise XML command formats and XML punctuation requirements, and wherein the schema comprises 1) a requirement that a tag contain only letters; 2) definitions of tag variables; and 3) naming conventions for the particular software service that has been requested.

3. A system comprising:
   a processor;
   a data bus coupled to the processor;
   a memory coupled to the data bus; and
   a computer-usable medium embodying computer program code, the computer program code comprising instructions executable by the processor and configured for processing a software service request by performing the steps of:
   receiving, at a service intermediary, a software service request from a software service requester, wherein the software service request is an Extensible Markup Language (XML) document that is requesting a software service from a service provider;
   checking, at the service intermediary, the software service request for well-formedness, wherein checking for well-formedness confirms that the software service request follows construct requirements of XML;
   validating, at the service intermediary, a schema of the software service request, wherein validating the schema confirms that the XML document follows protocols set for a particular type of request for a particular software service;
   in response to the service intermediary confirming that the XML document is well-formed and follows a proper schema for requesting the particular software service, augmenting the software service request with flags to create an augmented software service request, wherein the flags indicate that the XML document has passed the checking and validating steps;

transmitting the augmented software service request from the service intermediary to a service provider;

reading the flags at the service provider, wherein the flags indicate to the service provider that the augmented software service request has passed the checking and validating steps; and transmitting the requested software service from the service provider to the software service requester, wherein the service provider does not redundantly perform the checking and validating steps that have been performed by the service intermediary;

wherein the construct requirements of XML comprise XML command formats and XML punctuation requirements, and wherein the schema comprises 1) a requirement that a tag contain only letters; 2) definitions of tag variables; and 3) naming conventions for the particular software service that has been requested.

* * * * *